(12) United States Patent
Wang

(10) Patent No.: US 11,796,189 B2
(45) Date of Patent: Oct. 24, 2023

(54) VENTILATION AND AIR CONDITIONING SYSTEM

(71) Applicant: BEIJING XIAOMI MOBILE SOFTWARE CO., LTD., Beijing (CN)

(72) Inventor: Luxi Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 371 days.

(21) Appl. No.: 17/012,766

(22) Filed: Sep. 4, 2020

(65) Prior Publication Data
US 2021/0325051 A1 Oct. 21, 2021

(30) Foreign Application Priority Data

Apr. 17, 2020 (CN) .......................... 202010307539.7

(51) Int. Cl.
*F24F 1/0014* (2019.01)
*F24F 1/0057* (2019.01)
(Continued)

(52) U.S. Cl.
CPC ........ *F24F 1/0014* (2013.01); *B01D 46/0005* (2013.01); *B01D 46/4227* (2013.01);
(Continued)

(58) Field of Classification Search
CPC ........ F24F 1/0014; F24F 11/74; F24F 1/0057; F24F 13/20; F21F 1/0073; B01D 46/88;
(Continued)

(56) References Cited

U.S. PATENT DOCUMENTS

2011/0061527 A1* 3/2011 Sullivan ............... B01D 46/521
96/423
2014/0097730 A1 4/2014 Kim et al.
(Continued)

FOREIGN PATENT DOCUMENTS

CN 106895488 A 6/2017
CN 107975873 A 5/2018
(Continued)

OTHER PUBLICATIONS

Extended European Search Report dated Mar. 17, 2021 in corresponding European Patent Application No. 20198434.1, 7 pages.

*Primary Examiner* — Robert A Hopkins
*Assistant Examiner* — Qianping He
(74) *Attorney, Agent, or Firm* — Oblon, McClelland, Maier & Neustadt, L.L.P.

(57) ABSTRACT

The present disclosure provides a ventilation and air conditioning system. The ventilation and air conditioning system can include a ventilation and air conditioning body including a ventilation component and an automatic air-output device arranged at a ventilation outlet of the ventilation and air conditioning body and configured to open or close the ventilation outlet according to an operating state of the ventilation component. The automatic air-output device is coupled to a power switch of the ventilation component. When the ventilation component is powered on, the automatic air-output device opens the ventilation outlet of the ventilation component to allow fresh air of the ventilation component to flow indoors. When the ventilation component is powered off, the automatic air-output device closes the ventilation outlet.

19 Claims, 6 Drawing Sheets

(51) Int. Cl.
    *F24F 1/0067* (2019.01)
    *F24F 1/0073* (2019.01)
    *F24F 11/74* (2018.01)
    *F24F 13/20* (2006.01)
    *B01D 46/46* (2006.01)
    *B01D 46/00* (2022.01)
    *B01D 46/42* (2006.01)
    *B01D 46/88* (2022.01)

(52) U.S. Cl.
    CPC ............ *B01D 46/46* (2013.01); *B01D 46/88* (2022.01); *F24F 1/0057* (2019.02); *F24F 1/0067* (2019.02); *F24F 1/0073* (2019.02); *F24F 11/74* (2018.01); *F24F 13/20* (2013.01); *B01D 2279/50* (2013.01)

(58) Field of Classification Search
    CPC ............ B01D 46/0005; B01D 46/4227; B01D 46/46; B01D 2279/50

USPC .......................................................... 96/398
    See application file for complete search history.

(56) References Cited

U.S. PATENT DOCUMENTS

| | | |
|---|---|---|
| 2017/0254548 A1 | 9/2017 | Song et al. |
| 2019/0015768 A1* | 1/2019 | Alderman ............... G01F 1/075 |
| 2022/0003432 A1* | 1/2022 | Chen ..................... F24F 1/0014 |

FOREIGN PATENT DOCUMENTS

| | | | |
|---|---|---|---|
| CN | 209325925 U | | 8/2019 |
| EP | 2 719 969 A1 | | 4/2014 |
| KR | 10-2008-0071703 A | | 8/2008 |
| KR | 20130043981 A | * | 11/2011 |

* cited by examiner

VENTILATION AND AIR CONDITIONING SYSTEM

CROSS-REFERENCE TO RELATED APPLICATIONS

This application is based upon and claims priority to Chinese Patent Application No. 202010307539.7, filed on Apr. 17, 2020, the entire contents of which are incorporated herein by reference for all purposes.

TECHNICAL FIELD

The present disclosure generally relates to the field of air conditioning technology, including to a ventilation and air conditioning system.

BACKGROUND

Existing ventilation-air conditioners generally have an air outlet of an open structure during operation. When a ventilation component works, air output from an air conditioner is stopped by a baffle. However, when the ventilation component is not working, a ventilation outlet cannot be closed by the baffle. If the ventilation component is not working for a long time, dust may enter the interior of the ventilation component through the ventilation outlet from outside, resulting in failures in the ventilation component.

SUMMARY

The present disclosure provides a ventilation and air conditioning system, and aims to reduce failures of a ventilation component due to dust which enters through a ventilation outlet when the ventilation component is not in use.

The present disclosure provides a ventilation and air conditioning system that can include a ventilation and air conditioning body, and an automatic air-output device arranged at a ventilation outlet of the ventilation and air conditioning body, and configured to open or close the ventilation outlet according to an operating state of a ventilation component. Preferably, when the automatic air-output device closes the ventilation outlet, an outer surface of an outer panel of the automatic air-output device and an outer surface of a housing of the ventilation and air conditioning body are located on a common plane; and when the automatic air-output device opens the ventilation outlet, the outer panel of the automatic air-output device changes with respect to the outer surface of the housing of the ventilation and air conditioning body according to the operating state of the ventilation component.

Preferably, the ventilation outlet is located on the outer surface of the ventilation and air conditioning body, and the outer panel of the automatic air-output device is slidably arranged at the ventilation outlet. Further, the ventilation outlet can be provided with a sliding groove, the automatic air-output device is provided with a sliding block, the sliding block is fitted with the sliding groove, and an inner wall of the ventilation component is provided with a driving mechanism configured to drive the automatic air-output device to slide back and forth.

The ventilation outlet can be located on the outer surface of the ventilation and air conditioning body. The automatic air-output device can be configured as a cylindrical structure, and an axial central line of the automatic air-output device is perpendicular to the outer surface of the ventilation and air conditioning body. An ejecting mechanism ejects the automatic air-output device according to the operating state of the ventilation component, to make an outer surface of an outer panel of the automatic air-output device protrude beyond the outer surface of the ventilation and air conditioning body, or, the ejecting mechanism retracts the automatic air-output device according to the operating state of the ventilation component, to make the outer surface of the outer panel of the automatic air-output device located on the same plane as the outer surface of the ventilation and air conditioning body.

Preferably, an outer peripheral wall of the automatic air-output device is provided with an air output groove, and the automatic air-output device adjusts a size of the air output groove through rotation of the automatic air-output device about an axial central line of the automatic air-output device by means of a driving mechanism. Further, the automatic air-output device can be arranged at the ventilation outlet through a driving mechanism. The driving mechanism pushes the outer panel of the automatic air-output device out in a direction away from the outer surface of the ventilation and air conditioning body or retracts the outer panel of the automatic air-output device according to the operating state of the ventilation component, to regulate a direction and volume of air output through the ventilation outlet.

In an embodiment, at least two groups of driving devices are arranged on an inner surface of the automatic air-output device. Each of the driving devices can be configured to push an end of the automatic air-output device to open the ventilation outlet, and the automatic air-output device is pushed in a parallel manner or an oblique manner.

Preferably, the ventilation and air conditioning body can include the ventilation component and a heat exchanging component, and the ventilation component and the heat exchanging component are arranged in a common housing and separated by a partition board. A ventilation inlet of the ventilation component is in communication with a purification chamber through an air inlet duct, and an end of the purification chamber away from the air inlet duct is provided with the ventilation outlet. The purification chamber is provided with a filter screen therein, a first blower is provided between the filter screen and the ventilation outlet, and the first blower is adjacent to the ventilation outlet.

Further, the ventilation component and the heat exchanging component are arranged in the same housing and separated by the partition board. A heat exchanging unit is provided between a heat exchanging inlet and a heat exchanging outlet of the heat exchanging component, the heat exchanging unit has a U-shaped structure, an open end of the U-shaped structure faces downward and is provided with a second blower, and the second blower is adjacent to the heat exchanging outlet. The heat exchanging outlet is configured for the air inlet duct to pass through, run through the housing, and extend to an exterior of a side of the housing away from the ventilation component.

The present disclosure provides beneficial effects. For example, with the automatic air-output device arranged at the ventilation outlet of the ventilation component, the automatic air-output device is associated with power on and power off of the ventilation component. When the ventilation component is powered on, the automatic air-output device is triggered therewith to open the ventilation outlet of the ventilation component, to allow fresh air of the ventilation component to flow indoors. When the ventilation component is powered off, the automatic air-output device is triggered therewith to close the ventilation outlet. As a result, the ventilation outlet can be in a closed state when the ventilation component is not in use, thereby reducing accumulation of dust in the ventilation component caused by that the ventilation component not being used, so as to reduce dust-related failures of the ventilation component and prolong the service life of the ventilation component.

Other features and advantages of the present disclosure will be described in the following description, and will be obvious from the specification, or may be understood by implementing the present disclosure. The objectives and other advantages of the present disclosure may be implemented and achieved by the written description and the structures indicated particularly in the accompanying drawings.

Implementations of the technical schemes of the present disclosure will be further described in detail in combination with drawings and embodiments.

BRIEF DESCRIPTION OF THE DRAWINGS

The accompanying drawings, which are included to illustrate exemplary embodiments and understanding of the present disclosure, constitute a part of this specification and serve to illustrate the present disclosure with the exemplary embodiments, but do not limit the present disclosure.

DETAILED DESCRIPTION

Preferred embodiments of the disclosure will be described in conjunction with the accompanying drawings, and it shall be understood that the exemplary embodiments described here are only for describing and explaining the present disclosure, rather than limiting the present disclosure.

Embodiment 1

Figure 1:
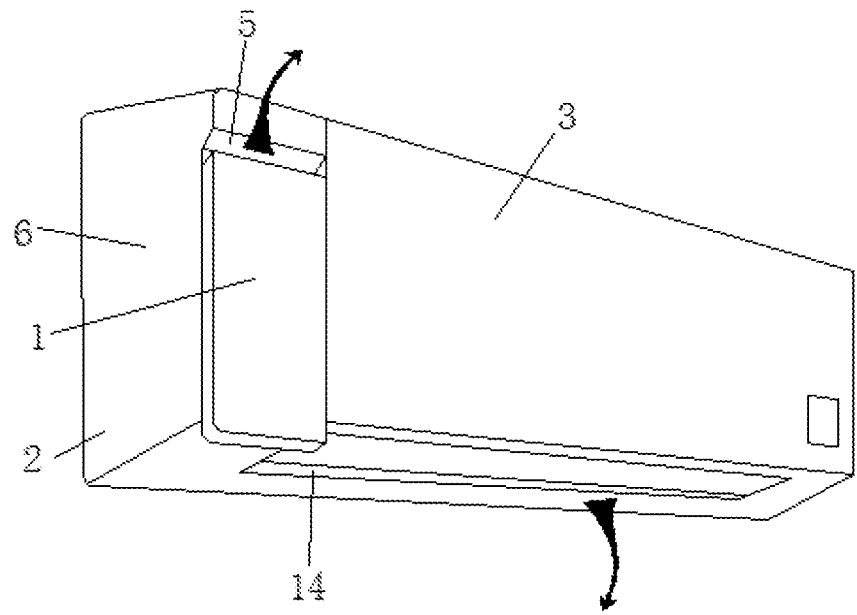
FIG. 1 is a schematic view of a first exemplary embodiment of the present disclosure.
Figure 2:
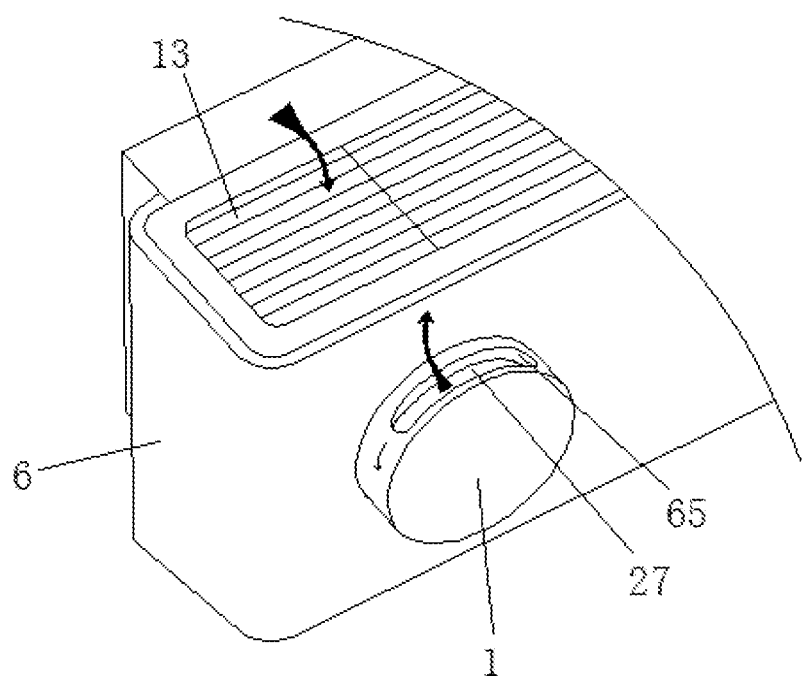
FIG. 2 is a schematic view of a second exemplary embodiment of the present disclosure.
Figure 3:
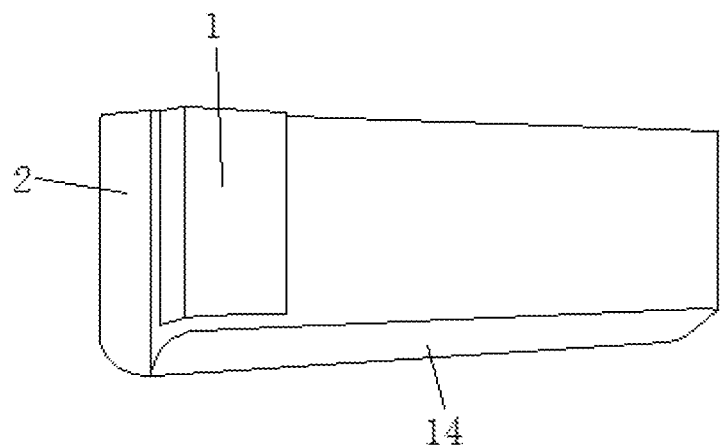
FIG. 3 is a schematic view of a third exemplary embodiment of the present disclosure.

As illustrated in FIG. 1 to FIG. 3, an exemplary embodiment of the present disclosure provides a ventilation and air conditioning system. The ventilation and air conditioning system can include a ventilation and air conditioning body, and an automatic air-output device 1 arranged at a ventilation outlet 5 of the ventilation and air conditioning body. The ventilation and air conditioning body includes a ventilation component 2. The automatic air-output device 1 is configured to open or close the ventilation outlet 5 according to an operating state of the ventilation component 2. When the automatic air-output device 1 closes the ventilation outlet 5, an outer surface of an outer panel of the automatic air-output device 1 and an outer surface of a housing of the ventilation and air conditioning body are located on a common plane. When the automatic air-output device 1 opens the ventilation outlet 5, the outer panel of the automatic air-output device 1 varies with respect to the outer surface of the housing of the ventilation and air conditioning body according to the operating state of the ventilation component 2.

With the automatic air-output device 1 arranged at the ventilation outlet 5 of the ventilation component 2, the automatic air-output device 1 is coupled to a power switch of the ventilation component 2. When the power switch is the ventilation component 2 is turned on, the automatic air-output device 1 is triggered therewith to open the ventilation outlet of the ventilation component, to allow fresh air of the ventilation component 2 to flow indoors. When the power switch of the ventilation component 2 is turned off, the automatic air-output device 1 is triggered therewith to close the ventilation outlet 5. As a result, the ventilation outlet 5 can be in a closed state when the ventilation component 2 is not working, thereby reducing accumulation of dust in the ventilation component 2 caused by that the ventilation component 2 not being used, so as to reduce dust-related failures of the ventilation component 2 and prolong the service life of the ventilation component 2.

The outer surface of the housing of the ventilation and air conditioning body is a front surface of the ventilation and air conditioning body, a rear surface of the ventilation and air conditioning body is configured to be mounted indoors. The front surface of the ventilation and air conditioning body may be flat or curved. The outer panel of the automatic air-output device is configured to adapt to a shape of the outer surface of the housing of the ventilation and air conditioning body.

Embodiment 2

Figure 4:
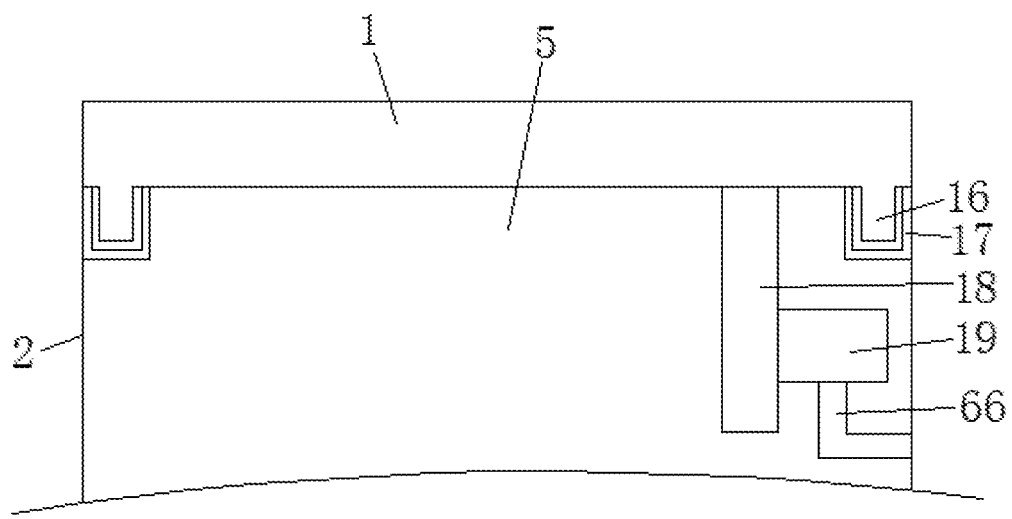
FIG. 4 is a schematic view of a first embodiment of a driving mechanism of the present disclosure.

As illustrated in FIG. 1 and FIG. 4, the ventilation outlet 5 is located on an outer surface of the ventilation and air conditioning body, and an outer panel of the automatic air-output device 1 is slidably arranged at the ventilation outlet 5. The ventilation outlet 5 is provided with a sliding groove 17, and the automatic air-output device 1 is provided with a sliding block 16. The sliding block 16 is fitted with the sliding groove 17. An inner wall of the ventilation component 2 is provided with a driving mechanism configured to drive the automatic air-output device 1 to slide back and forth.

The driving mechanism can allow the automatic air-output device to slide at the ventilation outlet, to enable the automatic air-output device to open or close the ventilation outlet during its sliding, and regulate air output volume from the ventilation outlet. In this embodiment, an outer surface of the outer panel of the automatic air-output device and the outer surface of the ventilation and air conditioning body are on a common plane, and the outer panel of the automatic air-output device slides reciprocally on the plane to open or close the ventilation outlet.

Specifically, a side of the automatic air-output device adjacent to an interior of the ventilation component is provided with a toothed plate. The toothed plate 18 engages with a third gear, and the third gear is connected to a drive motor through a coupling. When the drive motor drives the third gear to rotate, the third gear and the toothed plate engage with each other, and the toothed plate slides by means of the sliding groove and the sliding block. Thus, the automatic air-output device can open or close the ventilation outlet via the movement of the sliding groove and the sliding block, and regulate the air output volume of the ventilation outlet. Moreover, the ventilation outlet is closed when not in use, thereby lowering the possibility that dust enters the ventilation component through the ventilation outlet and causes damage to the ventilation component when the ventilation component is not in use.

The ventilation outlet 5 is perpendicular to a sliding direction of the automatic air-output device. When the automatic air-output device is located at the ventilation outlet and slides, the automatic air-output device can open an opening of the ventilation outlet to output the fresh air from the ventilation component into the indoors. The automatic air-output device has an area larger than a maximum area of the opening of the ventilation outlet.

Specifically, for example, the ventilation outlet is located at an upper half portion of an inner surface of the automatic air-output device. In such a case, when the ventilation outlet needs opening to output air, the automatic air-output device slides downwards; when the ventilation outlet needs closing, the automatic air-output device slides upwards to close the opening of the ventilation outlet.

For example, the ventilation outlet is located at a lower half portion of the inner surface of the automatic air-output device. In such a case, when the ventilation outlet needs opening to output air, the automatic air-output device slides upwards to open the ventilation outlet; when the ventilation outlet needs closing, the automatic air-output device slides downwards to close the ventilation outlet.

Embodiment 3

Figure 5:
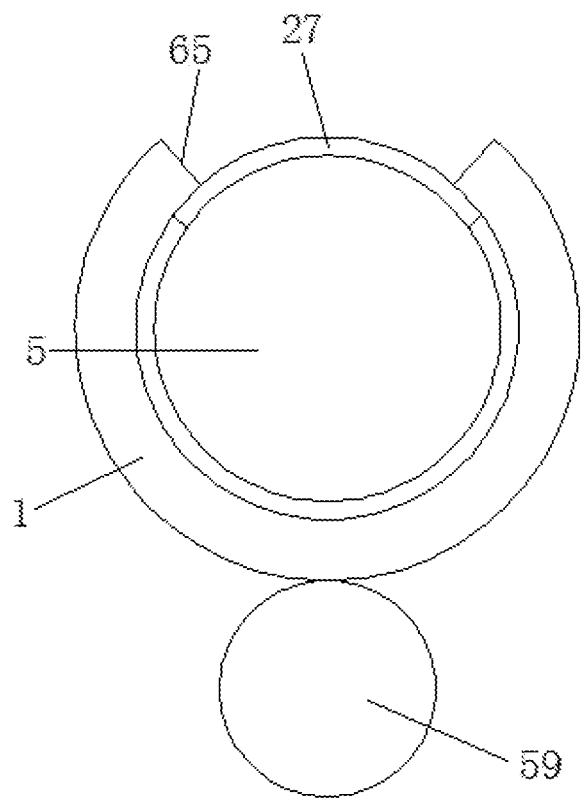
FIG. 5 is a schematic view of a second embodiment of a driving mechanism of the present disclosure.

As illustrated in FIG. 2 and FIG. 5, the ventilation outlet 5 is located on an outer surface of the ventilation and air conditioning body, and the automatic air-output device 1 is configured as a cylindrical structure. An axial central line of the automatic air-output device 1 is perpendicular to the outer surface of the ventilation and air conditioning body. An ejecting mechanism pushes out the automatic air-output device 1 according to an operating state of the ventilation component 2, to make an outer surface of an outer panel of the automatic air-output device 1 protrude beyond the outer surface of the ventilation and air conditioning body. Alternatively, the ejecting mechanism retracts the automatic air-output device 1 according to the operating state of the ventilation component 2, to make the outer surface of the outer panel of the automatic air-output device 1 located on the same plane as the outer surface of the ventilation and air conditioning body. The automatic air-output device 1 has an outer peripheral wall provided with an air output groove 65, and the automatic air-output device 1 adjusts the size of the air output groove 65 through rotation of the automatic air-output device around its own axial central line by means of a driving mechanism.

After the ejecting mechanism pushes out the automatic air-output device at the ventilation outlet, the driving mechanism can further rotate the automatic air-output device to change the size of the air output groove, and hence the air output volume from the ventilation outlet can be regulated. In this embodiment, when the automatic air-output device starts to work, the outer panel thereof protrudes from the ventilation component, such that the outer panel of the automatic air-output device is higher than the outer surface of the ventilation and air conditioning body, and then the automatic air-output device is rotated to achieve the purpose that the automatic air-output device adjusts the air output groove.

Specifically, the automatic air-output device is configured as the cylindrical structure; an outer peripheral wall of an end of the automatic air-output device in the interior of the ventilation component is provided with teeth; the end provided with the teeth is configured to engage with a fourth gear; and the fourth gear is connected to a drive motor. When the air output groove needs to be adjusted, the drive motor drives the fourth gear to rotate, and after rotation, the fourth gear engages with the teeth provided on the outer peripheral wall of the automatic air-output device, such that the size of the air output groove can be adjusted. That is, the air output volume from the ventilation outlet can be regulated by the rotation of the automatic air-output device. Preferably, the ejecting mechanism is a linear drive motor.

Embodiment 4

Figure 6:
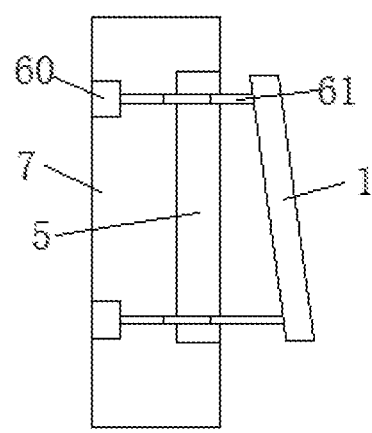
FIG. 6 is a schematic view of a third embodiment of a driving mechanism of the present disclosure.

As illustrated in FIG. 3 and FIG. 6, the automatic air-output device 1 is arranged at the ventilation outlet 5 via a driving mechanism, the driving mechanism ejects an outer panel of the automatic air-output device 1 away from an outer surface of the ventilation and air conditioning body or retracts the outer panel of the automatic air-output device 1 according to an operating state of the ventilation component 2, such that an air output direction and air output volume of the ventilation outlet 5 can be regulated. At least two groups of driving devices are provided on an inner surface of the automatic air-output device 1. The driving devices each are configured to push a corresponding end of the automatic air-output device and open the ventilation outlet 5. Pushing the automatic air-output device 1 includes pushing the automatic air-output device 1 in a parallel manner or an oblique manner.

When the ventilation component 2 is turned on, the automatic air-output device is triggered synchronously. The driving mechanism of the automatic air-output device ejects the automatic air-output device, and an angle of ejecting the automatic air-output device is correspondingly adjusted along with the operating state of the ventilation component. In this embodiment, after starting to work, the outer panel of the automatic air-output device 1 is in parallel with and higher than the outer surface of the ventilation and air conditioning body, or the outer panel of the automatic air-output device is adjusted to be inclined with respect to the outer surface of the ventilation and air conditioning body, according to the operating state of the ventilation component, so as to achieve the purpose of air direction adjustment.

Specifically, a drive motor is arranged inside the ventilation component, an end of the drive motor adjacent to the ventilation outlet is provided with a telescoping rod, and an end of the telescoping rod away from the drive motor is connected to the inner surface of the automatic air-output device. Preferably, the drive motor is a linear drive motor. The linear drive motor enables the telescoping rod to stretch or retract, and an angle between the automatic air-output device and a section of the ventilation outlet can be adjusted. At least two drive motors are provided. When the two drive motors work together, the automatic air-output device can be pushed out in parallel with a flow direction of the fresh air from the ventilation outlet. When one of the two drive motors works and the other one does not work, an air outlet is formed at an end of the automatic air-output device where the drive motor is working, such that a purpose of outputting the fresh air obliquely is realized, and various air direction adjustments to the air outlet of the ventilation outlet can be achieved.

Embodiment 5

Figure 7:
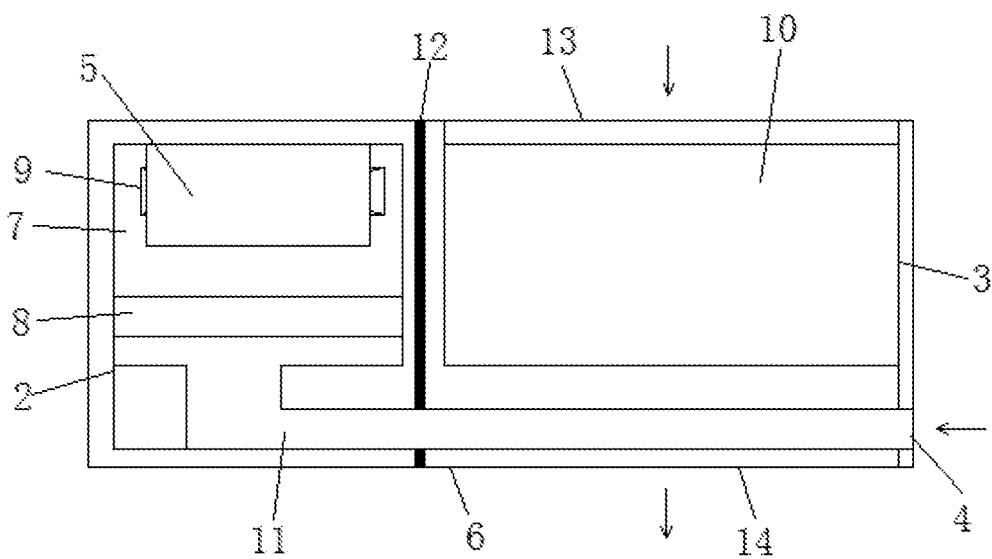
FIG. 7 is a schematic view of an inner structure of the present disclosure.
Figure 8:
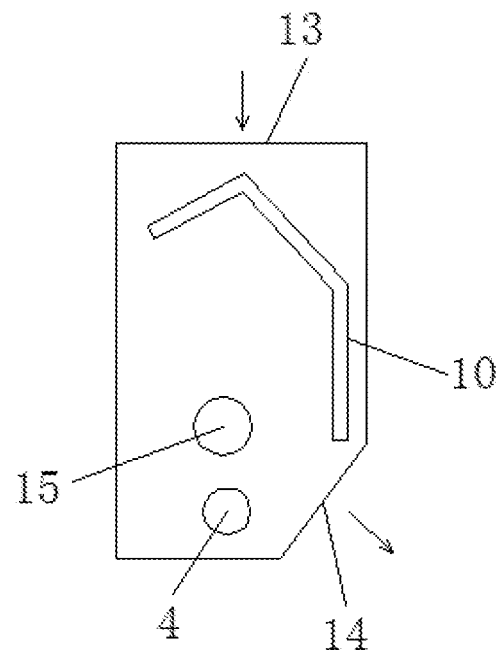
FIG. 8 is a schematic view of another inner structure of the present disclosure.
Figure 9:
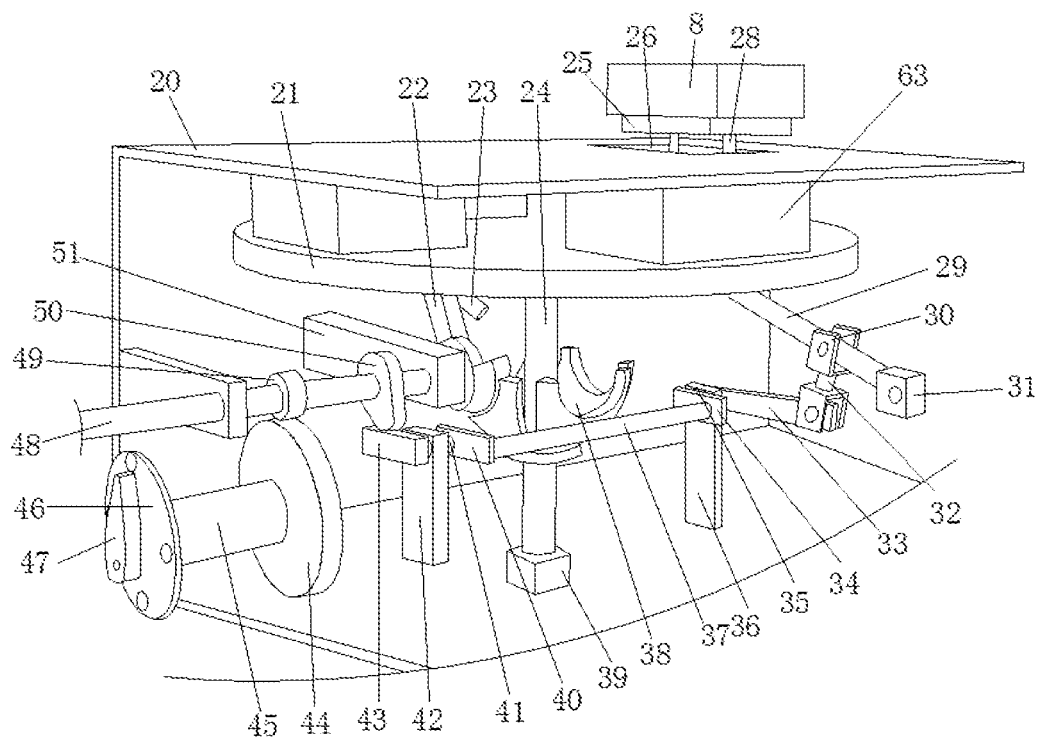
FIG. 9 is a schematic view of a filter replacement device of the present disclosure.
Figure 10:
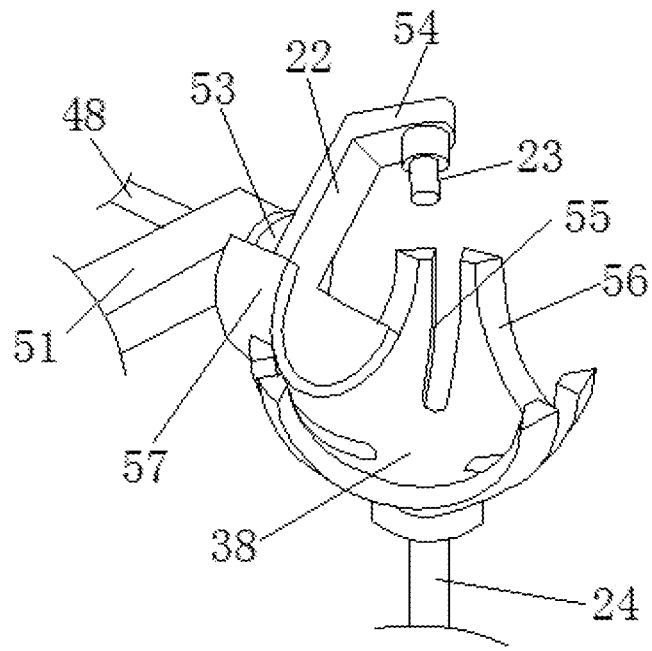
FIG. 10 is a schematic view of a switching mechanism of the present disclosure.
Figure 11:
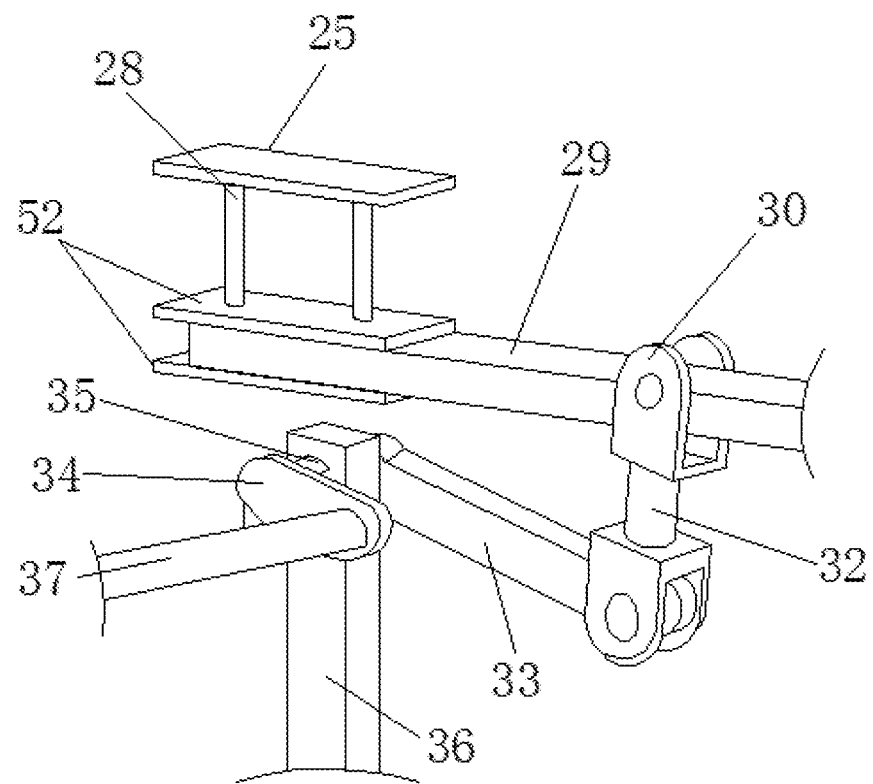
FIG. 11 is a schematic view of a pushing mechanism of the present disclosure.
Figure 12:
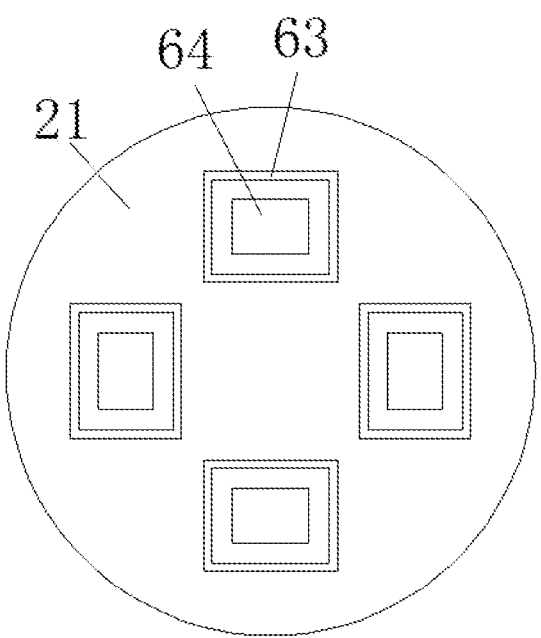
FIG. 12 is a schematic view of a first turntable of the present disclosure.

As illustrated in FIG. 7 and FIG. 8, the ventilation and air conditioning body includes a ventilation component 2 and a heat exchanging component 3. The ventilation component 2 and the heat exchanging component 3 are arranged in a common housing 6 and separated by a partition board 12. A ventilation inlet 4 of the ventilation component 2 is in communication with a purification chamber 7 through an air inlet duct 11. An end of the purification chamber 7 away from the air inlet duct 11 is provided with a ventilation outlet 5. The purification chamber 7 is provided with a filter screen 8 therein. A first blower 9 is provided between the filter screen 8 and the ventilation outlet 5, and the first blower 9 is arranged adjacent to the ventilation outlet 5. The ventilation component 2 and the heat exchanging component 3 are arranged in the same housing 6 and separated by the partition board 12. A heat exchanging unit 10 is provided between a heat exchanging inlet 13 and a heat exchanging outlet 14 of the heat exchanging component 3. The heat exchanging unit 10 has a U-shaped structure. An open end of the U-shaped structure faces downward and is provided with a second blower 15, and the second blower 15 is arranged adjacent to the heat exchanging outlet 14. The heat exchanging outlet 14 is configured for the air inlet duct 11 to pass through, run through the housing 6, and extend to an exterior of a side of the housing 6 away from the ventilation component 2.

The heat exchanging inlet 13 of the heat exchanging component 3 is configured to guide indoor air to the heat exchanging unit 10. The air that has undergone heat exchange by the heat exchanging unit 10 is discharged from the heat exchanging outlet 14 and the second blower arranged above the heat exchanging outlet 14.

Furthermore, the air inlet duct 11 of the ventilation component 2 passes through the heat exchanging outlet 14, and air flowing through the air inlet duct 11 can experience pre-heat exchange by the heat exchanging outlet 14, such that the air entering the purification chamber 7 from the air inlet duct 11 has gone through pre-heat exchange, further reducing a difference between a temperature of air purified by the ventilation component 2 and an indoor temperature, and significantly improving comfort for indoor users.

A side of the heat exchanging component 3 away from the ventilation component 2 is provided with a control chamber, the control chamber is connected to a display screen 18 via a wire, and the display screen is embedded in an outer surface of the housing 6. The heat exchanging inlet 13 is provided with an air inlet screen, and the air inlet screen is detachably arranged at an upper top surface of the housing 6.

The air inlet screen can filter air entering the heat exchanging component 3 and uniformly guide outdoor air into the heat exchanging component 3 for heat exchange. The control chamber is configured to be connected to a power supply, to drive the heat exchanging unit 10 and the second blower 15 of the heat exchanging component 3, and to drive a first motor of the ventilation component 2 and the automatic air-output device 1. The display screen 18 is configured to display an operating stare of the heat exchanging component 3 or the ventilation component 2.

As illustrated in FIG. 1, an outer surface of the housing 6 is provided with a mount, and the mount is arranged at a side away from the display screen. The mount can enable the housing to be smoothly hung indoors, and the heat exchanging component 3 or the ventilation component 2 can be used to exchange heat or generate fresh air indoors.

The heat exchanging outlet is provided with an air-conditioner wind shield, and the air-conditioner wind shield can be started together with the heat exchanging component, to open or close the heat exchanging outlet.

Embodiment 6

As illustrated in FIG. 9 to FIG. 12, the ventilation component can be provided with a filter replacement device therein, and the filter replacement device is connected to a controller. The first blower is provided with a rotation-speed acquiring device, and the rotation-speed acquiring device is connected to the controller via a wire.

The controller monitors an operating state of the ventilation component by acquiring a rotation speed of the first blower. When the rotation speed of the first blower exceeds a preset value, the controller starts the filter replacement device, such that the filter replacement device can replace the filter screen automatically, which reduces manual regular replacement of filters, and significantly raises efficiency of indoor air purification of the ventilation component. In addition, since the filter screen is replaced in time, damage to the ventilation component caused by dirt from a waste filter screen can be reduced, significantly prolonging the service life of the ventilation component.

As illustrated in FIG. 9 to FIG. 12, the filter replacement device includes a fourth rotating shaft 48, a pushing mechanism, and a switching mechanism. The fourth rotating shaft 48 runs through a replacement casing 20. The replacement casing 20 is configured to fix the filter replacement device in the ventilation component. A first end of the fourth rotating shaft 48 located outside the replacement casing 20 is connected to a motor, a second end of the fourth rotating shaft 48 is connected to the switching mechanism. A side of the fourth rotating shaft 48 adjacent to an inner wall of the replacement casing 20 is sequentially provided with a second gear 49 and a cam 50 which are spaced apart from each other.

A first gear 44 is provided below and engages with the second gear 49. A side of the first gear 44 adjacent to the replacement casing 20 is provided with a third rotating shaft 45. The third rotating shaft 45 runs through the inner wall of the replacement casing 20 and extends out of an outer wall of the replacement casing 20. An end of the third rotating shaft 45 extending out of the outer wall of the replacement casing 20 is connected to an indicator board 47. The outer wall of the replacement casing 20 is provided with a display disc 46, and a plurality of filter indication marks are uniformly distributed on the display disc 46. A third fixed plate 51 is provided between the cam 50 and the switching mechanism. The fourth rotating shaft 48 is rotatably arranged to the replacement casing 20 and the third fixed plate 51. The third rotating shaft 45 is rotatably arranged to the replacement casing 20. The switching mechanism includes a first rotating shaft 24, a hemispheroid 38, and a switch lever 23. The first rotating shaft 24 has a first end rotatably arranged on a bearing seat 39. An end of the bearing seat 39 away from the first rotating shaft 24 is fixed to an inner surface of the replacement casing 20. The first rotating shaft 24 has a second end running through the hemispheroid 38 and connected to a first turntable 21. The first turntable 21 has an upper surface provided with a plurality of storage boxes 63 which are spaced apart from each other. Each storage box 63 has an inner bottom provided with a through hole 64, and the through hole 64 runs through the storage box 63 and the first turntable 21.

An axial central line of the hemispheroid 38 coincides with an axial central line of the first rotating shaft 24. A first surface of the hemispheroid 38 adjacent to the first turntable 21 is a spherical concave surface, and a second surface of the hemispheroid 38 adjacent to the bearing seat 39 is a spherical convex surface. An edge of the hemispheroid 38 is provided with a plurality of switch holes 55 which are spaced apart from each other, and an arc notch 56 is arranged between every two the switch holes 55. An end portion of the fourth rotating shaft 48 is connected to a connecting disc 53. A side of the connecting disc 53 away from the third fixed plate 51 is connected to a first connecting rod 22. An end of the first connecting rod 22 away from the connecting disc 53 is provided with a protruding block 54.

A side of the protruding block 54 adjacent to the first connecting rod 22 is provided with a switch lever 23. The switch lever 23 is configured to cooperate with the switch holes 55 to drive the hemispheroid 38 to rotate. A side of the first connecting rod 22 away from the protruding block 54 is provided with an arc baffle 57 protruding towards a direction of the hemispheroid 38. The arc baffle 57 and the arc notch 56 cooperate with each other, and a diameter of the arc baffle 57 is less than a diameter of the arc notch 56. A surface of the replacement casing 20 adjacent to the storage box 63 is provided with a via hole 26. The via hole 26 is configured in such a way that the pushing mechanism can push the filter screen 8 out of the storage box 63 to the purification chamber 7 through the via hole 26.

A third connecting plate 43 is provided below the cam 50, a side of the third connecting plate 43 is provided with a six rotating shaft 41, and the six rotating shaft 41 is rotatably arranged to the second fixed plate 42. An end of the second fixed plate 42 is fixed to the inner wall of the replacement casing 20. An end of the six rotating shaft 41 away from the third connecting plate 43 is connected to a second connecting plate 40, and the second connecting plate 40 is located at a side of the second fixed plate 42 away from the third connecting plate 43.

A side of the second connecting plate 40 away from the six rotating shaft 41 is fixedly provided with a fifth rotating shaft 37, and another end of the fifth rotating shaft 37 is fixedly connected to a first connecting plate 34. A side of the first connecting plate 34 away from the fifth rotating shaft 37 is fixedly connected to a second rotating shaft 35. The second rotating shaft 35 runs through and is rotatably arranged to a first fixed plate 36. A first end of the first fixed plate 36 is fixed to the inner wall of the replacement casing 20. An end of the second rotating shaft 35 away from the first connecting plate 34 is fixedly connected to a fourth connecting rod 33, and another end of the fourth connecting rod 33 is rotatably connected to a U-shaped hole of a U-shaped bracket 30. A surface of the U-shaped bracket 30 away from the U-shaped hole is provided with a third connecting rod 32, and another end of the third connecting rod 32 is symmetrically provided with another U-shaped bracket 30.

A second connecting rod 29 is rotatably connected in a U-shaped hole of the another U-shaped bracket 30. A first end of the second connecting rod 29 is articulated with a first limiting block 31. A side of the first limiting block 31 away from the second connecting rod 29 is fixed to the inner wall of the replacement casing 20. A second end of the second connecting rod 29 is clamped by two clamping plates 52 and fixed together therewith. An upper side of one clamping plate 52 adjacent to a bottom surface of the first turntable 21 is provided with supporting rods 28 spaced apart from each other. A bearing plate 25 is provided on ends of the supporting rods 28 away from the clamping plate 52, and the bearing plate 25 is configured to push up the filter screen 8.

When the filter screen in the purification chamber needs to be replaced, the controller sends an instruction to the motor. When the motor rotates, the fourth rotating shaft is driven to rotate, and the cam, the second gear, and the switching mechanism are driven to rotate together as the fourth rotating shaft rotates.

After the cam rotates, a protruding end of the cam comes in contact with the third connecting plate, such that the third connecting plate 43 can be pressed downwards, and the end of the third connecting plate moves downwards to drive the six rotating shaft to rotate. When the six rotating shaft rotates, the second connecting plate and the fifth rotating shaft are driven to rotate together. In turn, the rotation of the fifth rotating shaft drives the first connecting plate to rotate. The first connecting plate drives the second rotating shaft to rotate. The rotation of the second rotating shaft drives the fourth connecting rod to move up and down. The upward and downward movement of the fourth connecting rod is transmitted through the U-shaped bracket and the third connecting rod, so that the second connecting rod performs lever movement under the action of the movement of the U-shaped bracket or the articulation of the first limiting block, and an end of the second connecting rod away from the first limiting block is pushed upwards. Thus, the pushing mechanism pushes up the filter screen on the first turntable into the purification chamber.

The switching mechanism works by the rotation of the fourth rotating shaft. Specifically, the fourth rotating shaft rotates to drive the connecting disc to rotate, and the first connecting rod and the arc baffle which are connected to the connecting disc are also brought into rotation, which further enables the protruding block and the switch lever to rotate together. The protruding block and the switch lever conduct circular motion about an axial central line of the fourth rotating shaft, and drive the switch holes arranged at intervals in the hemispheroid to switch, such that the hemispheroid can rotate via the first rotating shaft and the bearing seat. When the first rotating shaft rotates, the first turntable is driven to rotate, such that the storage boxes on the upper surface of the first turntable rotate. As the storage boxes rotate, the storage box with a new filter screen is driven to rotate to the via hole in the replacement casing. The new filter screen is pushed out of the storage box and the replacement casing by the pushing mechanism, and then reaches the purification chamber to be used. The old filter screen falls into a corresponding storage box when the pushing mechanism moves downwards. Thus, the replacement of the filter screen is realized.

Furthermore, in order to observe the filter screens in the storage boxes clearly, the second gear during rotation engages with the first gear. When the first gear rotates, the third rotating shaft is driven to rotate. The rotation of the third rotating shaft drives the indicator board to rotate. The display disc is provided with at least four indication marks, the indication marks are in one-to-one correspondence with the storage boxes, and the indication marks are numbers which are ordered. An initial state of the indicator board is numbered as 1, and a finishing state thereof is numbered as 4. When the fourth rotating shaft rotates, the filter screen is replaced once by cooperation of the switching mechanism and the pushing mechanism. The indicator board rotates once and correspondingly rotates to an indication mark of the filter screen in use, which makes it convenient for a user to check a using state of the filter screen at any time during operation, and also makes it easy to store new filter screens in the storage boxes when all of the filter screens in the storage boxes are used.

The controller receives a rotation speed of the blower and starts the motor when the rotation speed of the blower exceeds a preset value. The motor drives the fourth rotating shaft to enable the fourth rotating shaft to firstly drive the pushing mechanism through the cam. The pushing mechanism allows a used the filter screen to lower and fall into a corresponding storage box. Due to the rotation of the fourth rotating shaft, the switching mechanism can drive the first turntable to position the storage box with a new filter screen at the via hole. Again, the movement of the cam drives the pushing mechanism to push the new filter screen out of the storage box storing the new filter screen, and the new filter screen reaches the purification chamber through the via hole, such that the used filter screen is replaced with the new filter screen. Furthermore, the fourth rotating shaft is used to drive the indicator board to work together, to make an indication arrow of the indicator board point to the indication mark of the filter screen in use, such that the user can check a using state of the filter screen at any time. Thus, it is possible to ensure that the filter screen is in an effective filtering state, boost the ventilation efficiency of the ventilation component, and reduce secondary pollution due to dust accumulation on the filter screen or failures of the ventilation component.

Obviously, those skilled in the art can make various modifications and variations to the present disclosure without departing from the spirit or scope of the disclosure. Accordingly, the present disclosure is intended to include the modifications and variations if the modifications and variations to the present disclosure fall within the scope of the claims and the equivalent thereof.

What is claimed is:

1. A ventilation and air conditioning system, comprising:
   a ventilation and air conditioning body having a ventilation component and a heat exchanging component arranged in a common housing and separated by a partition board, wherein the ventilation component has a ventilation outlet, and the heat exchanging component has a heat exchanging inlet and a heat exchanging outlet,
   wherein the ventilation and air conditioning system comprises an automatic air-output device arranged at the ventilation outlet of the ventilation component, the automatic air-output device being configured to open or close the ventilation outlet according to an operating state of the ventilation component;
   a ventilation inlet of the ventilation component is in communication with a purification chamber through an air inlet duct, and an end of the purification chamber away from the air inlet duct is provided with the ventilation outlet; and
   a heat exchanging unit is provided between the heat exchanging inlet and the heat exchanging outlet of the heat exchanging component, the heat exchanging unit has a U-shaped structure where an open end of the U-shaped structure faces downward and is provided with a second blower that is arranged adjacent to the heat exchanging outlet, and
   the heat exchanging outlet is configured for the air inlet duct to pass through, and the air inlet duct extends through the housing to an exterior of a side of the housing away from the ventilation component.

2. The ventilation and air conditioning system according to claim 1, wherein:
   when the automatic air-output device closes the ventilation outlet, an outer surface of an outer panel of the automatic air-output device and an outer surface of a housing of the ventilation and air conditioning body are located on a common plane, and
   when the automatic air-output device opens the ventilation outlet, the outer panel of the automatic air-output device changes with respect to the outer surface of the housing of the ventilation and air conditioning body according to the operating state of the ventilation component.

3. The ventilation and air conditioning system according to claim 1, wherein the ventilation outlet is located on an outer surface of the ventilation and air conditioning body, and an outer panel of the automatic air-output device is slidably arranged at the ventilation outlet.

4. The ventilation and air conditioning system according to claim 3, wherein the ventilation outlet is provided with a sliding groove, the automatic air-output device is provided with a sliding block that is fitted with the sliding groove, and an inner wall of the ventilation component is provided with a driving mechanism that is configured to drive the automatic air-output device to slide back and forth.

5. The ventilation and air conditioning system according to claim 1, wherein:
   the ventilation outlet is located on an outer surface of the ventilation and air conditioning body,
   the automatic air-output device is configured as a cylindrical structure having an axial central line that is perpendicular to the outer surface of the ventilation and air conditioning body, and
   an ejecting mechanism:
     pushes the automatic air-output device out according to the operating state of the ventilation component to make an outer surface of an outer panel of the automatic air-output device protrude beyond the outer surface of the ventilation and air conditioning body, or
     retracts the automatic air-output device according to the operating state of the ventilation component to make the outer surface of the outer panel of the automatic air-output device located on a common plane with the outer surface of the ventilation and air conditioning body.

6. The ventilation and air conditioning system according to claim 5, wherein an outer peripheral wall of the automatic air-output device is provided with an air output groove, and the automatic air-output device adjusts a size of the air output groove through rotation of the automatic air-output device about the axial central line of the automatic air-output device by a driving mechanism.

7. The ventilation and air conditioning system according to claim 1, wherein the automatic air-output device is arranged at the ventilation outlet through a driving mechanism that ejects an outer panel of the automatic air-output device away from an outer surface of the ventilation and air conditioning body or retracts the outer panel of the automatic air-output device according to the operating state of the ventilation component, and a direction and volume of air output through the ventilation outlet is regulated.

8. The ventilation and air conditioning system according to claim 7, wherein at least two groups of driving devices are arranged on an inner surface of the automatic air-output device, each of the driving devices is configured to push an end of the automatic air-output device to open the ventilation outlet, and the automatic air-output device is pushed in a parallel or an oblique manner.

9. The ventilation and air conditioning system according to claim 1, wherein:
the purification chamber is provided with a filter screen therein, a first blower is provided adjacent to the ventilation outlet, between the filter screen and the ventilation outlet.

10. The ventilation and air conditioning system according to claim 9, wherein the ventilation component further comprises a filter replacement device and a controller, the filter replacement device is connected to the controller that is configured to enable the filter replacement device to replace the filter screen.

11. The ventilation and air conditioning system according to claim 10, wherein the first blower is provided with a rotation-speed acquiring device that is connected to the controller via a wire, and the controller is configured to start the filter replacement device when a rotation speed of the first blower, acquired by the rotation-speed acquiring device, exceeds a preset value.

12. The ventilation and air conditioning system according to claim 11, wherein the filter replacement device further comprises:
a replacement casing that is configured to fix the filter replacement device in the ventilation component;
a pushing mechanism that is configured to push out the filter screen; and
a switching mechanism, a first rotating shaft, a hemispheroid, and a switch lever.

13. The ventilation and air conditioning system according to claim 12, wherein a first end of the first rotating shaft is rotatably arranged on a bearing seat, where an end of the bearing seat away from the first rotating shaft is fixed to an inner surface of the replacement casing, and a second end of the first rotating shaft extends through the hemispheroid and is connected to a turntable.

14. The ventilation and air conditioning system according to claim 13, wherein the turntable has an upper surface provided with a plurality of storage boxes arranged at intervals, where each storage box has an inner bottom provided with a through hole, and the through hole extends through the storage box and the turntable.

15. The ventilation and air conditioning system according to claim 13, wherein a first surface of the hemispheroid adjacent to the turntable is a spherical concave surface, and a second surface of the hemispheroid adjacent to the bearing seat is a spherical convex surface.

16. The ventilation and air conditioning system according to claim 14, wherein an edge of the hemispheroid is provided with a plurality of switch holes arranged at intervals, and an arc notch is provided between every two of the plurality of the switch holes.

17. The ventilation and air conditioning system according to claim 12, wherein the replacement casing is provided with a display disc on an outer wall of the replacement casing, and a plurality of filter indication marks are uniformly distributed on the display disc.

18. The ventilation and air conditioning system according to claim 17, wherein the filter replacement device further comprises a first fixed plate having a first end that is fixed to an inner wall of the replacement casing and a second end that is connected to a second rotating shaft.

19. The ventilation and air conditioning system according to claim 18, wherein the second rotating shaft extends through the first fixed plate and is fixedly connected to a first end of a connecting rod, and a second end of the connecting rod is rotatably connected to a U-shaped hole of a U-shaped bracket.

* * * * *